(12) United States Patent
Yuan

(10) Patent No.: US 12,536,037 B2
(45) Date of Patent: Jan. 27, 2026

(54) TASK PROCESSING SYSTEM, METHOD, AND APPARATUS

(71) Applicant: ZHEJIANG E-COMMERCE BANK CO., LTD., Zhejiang (CN)

(72) Inventor: Wei Yuan, Zhejiang (CN)

(73) Assignee: ZHEJIANG E-COMMERCE BANK CO., LTD., Hangzhou (CN)

( * ) Notice: Subject to any disclaimer, the term of this patent is extended or adjusted under 35 U.S.C. 154(b) by 221 days.

(21) Appl. No.: 18/393,630

(22) Filed: Dec. 21, 2023

(65) Prior Publication Data

US 2024/0126598 A1    Apr. 18, 2024

Related U.S. Application Data

(63) Continuation of application No. PCT/CN2022/101887, filed on Jun. 28, 2022.

(30) Foreign Application Priority Data

Sep. 3, 2021 (CN) .......................... 202111034591.0

(51) Int. Cl.
*G06F 9/48* (2006.01)
*H04W 12/08* (2021.01)

(52) U.S. Cl.
CPC .......... *G06F 9/4881* (2013.01); *H04W 12/08* (2013.01)

(58) Field of Classification Search
CPC ..... G06F 9/4881; H04W 12/08; G06Q 20/32; G06Q 20/38
See application file for complete search history.

(56) References Cited

U.S. PATENT DOCUMENTS

| 9,305,309 B2* | 4/2016 | Fisher ................ G06Q 20/3223 |
| 2015/0088674 A1* | 3/2015 | Flurscheim .......... G06Q 20/326 |
| | | 705/17 |

FOREIGN PATENT DOCUMENTS

| CN | 107194695 A | 9/2017 |
| CN | 111047313 A | 4/2020 |
| CN | 111415143 A | 7/2020 |
| CN | 111639932 A | 9/2020 |
| WO | WO 2020223932 A1 | 11/2020 |

* cited by examiner

*Primary Examiner* — Bryan Y Lee
(74) *Attorney, Agent, or Firm* — Seed IP Law Group LLP

(57) ABSTRACT

A system includes a first device and a second device. The first device is configured to generate a target processing task based on a target object, generate a first identification code corresponding to the target object based on the target processing task, and display the first identification code; the second device is configured to obtain the first identification code through scanning, generate a task execution instruction corresponding to the target processing task based on the first identification code when first verification on the first identification code succeeds, establish a Bluetooth connection channel with the first device, and send the task execution instruction to the first device based on the Bluetooth connection channel; and the first device is further configured to receive the task execution instruction, and process the target processing task based on the task execution instruction when second verification on the task execution instruction succeeds.

20 Claims, 6 Drawing Sheets

TASK PROCESSING SYSTEM, METHOD, AND APPARATUS

The present application claims priority to Chinese Patent Application No. 202111034591.0, filed with the China National Intellectual Property Administration on Sep. 3, 2021, and entitled "TASK PROCESSING SYSTEM, METHOD, AND APPARATUS", which is incorporated herein by reference in its entirety.

TECHNICAL FIELD

The present specification relates to the field of computer technologies, and in particular, to a task processing system, a task processing method, a task processing apparatus, a computing device, a computer-readable storage medium, and a computer program.

BACKGROUND

With the development of Internet technologies, the network has become an important part of people's lives. In particular, network payment provides convenience for people. However, in current network payment, payment is completed when both a payee and a payer are online, and thus a high calculation demand and network bandwidth requirement is imposed on a payment network environment. In addition, when either the payee or the payer scans a code for payment, only a code value of one party is verified, resulting in low payment security.

SUMMARY

The specification provides a task processing system that can complete payment more securely through two-way verification even if both the payee and the payer are offline.

Implementations of the present specification provide a task processing system. The present specification also relates to a task processing method, a task processing method apparatus, a computing device, a computer-readable storage medium, and a computer program, to reduce technical disadvantages in the existing technologies.

According to an aspect of the implementations of the present specification, a task processing system is provided, including: a first intelligent device and a second intelligent device; the first intelligent device being configured to generate a target processing task based on a target object, generate a first identification code corresponding to the target object based on the target processing task, and display the first identification code to the second intelligent device; the second intelligent device being configured to obtain the first identification code through scanning, generate a task execution instruction corresponding to the target processing task based on the first identification code when first verification on the first identification code succeeds, establish a Bluetooth connection channel with the first intelligent device by using a Bluetooth device, and send the task execution instruction to the first intelligent device based on the Bluetooth connection channel; and the first intelligent device being further configured to receive the task execution instruction by using the Bluetooth connection channel, and process the target processing task based on the task execution instruction when second verification on the task execution instruction succeeds.

In some implementations, in the system, the first intelligent device includes a first processing module and a first verification module; the first verification module is configured to generate the target processing task based on the target object, and send the target processing task to the first processing module; the first processing module is configured to receive the target processing task, generate the first identification code corresponding to the target object based on the target processing task, and display the first identification code to the second intelligent device, where the first identification code includes first attribute information of the first intelligent device and a Bluetooth address of the first intelligent device.

In some implementations, in the system, the first intelligent device includes a first processing module and a first verification module, and the second intelligent device includes a second processing module and a second verification module; the first verification module is configured to generate the target processing task based on the target object, and send the target processing task to the first processing module; the first processing module is configured to receive the target processing task, generate the first identification code corresponding to the target object based on the target processing task, and display the first identification code to the second intelligent device; the second processing module is configured to obtain the first identification code through scanning, and send the first identification code to the second verification module; and the second verification module is configured to parse the first identification code, perform first verification based on a parsing result of parsing the first identification code, and send a verification result to the second processing module when the first verification succeeds.

In some implementations, the second processing module is further configured to establish a pairing relationship with the first processing module based on a Bluetooth address of the first intelligent device, to establish the Bluetooth connection channel.

In some implementations, the second verification module is configured to establish a pairing relationship with the first verification module based on a Bluetooth address of the first intelligent device, to establish the Bluetooth connection channel.

In some implementations, the second verification module is further configured to determine first attribute information of the first intelligent device and a Bluetooth address of the first intelligent device based on the parsing result of parsing the first identification code, perform first verification on the first attribute information and the Bluetooth address to generate a first verification result, and send the first verification result to the second processing module when the first verification succeeds, where the first attribute information includes a receiving name of the first intelligent device receiving an object value corresponding to the target object and a digital certificate obtained from a third-party authentication authority; and the second processing module is further configured to determine processing information of the target object based on the first attribute information, generate the task execution instruction in response to the target processing task based on the processing information, and send the task execution instruction to the first processing module based on the Bluetooth connection channel.

In some implementations, the first processing module is further configured to receive the task execution instruction by using the Bluetooth connection channel, and send the task execution instruction to the first verification module; the first verification module is further configured to parse the task execution instruction to determine second attribute information of the second intelligent device and attribute information that is of the object value corresponding to the target object and that is obtained from the second intelligent device, perform second verification on the second attribute information and the attribute information that is of the object value corresponding to the target object and that is obtained from the second intelligent device, to generate a second verification result, and return the second verification result to the first processing module when the second verification succeeds, where the second attribute information includes a receiving name of the second intelligent device receiving the object value corresponding to the target object and a digital certificate obtained from the third-party authentication authority; and the first processing module is further configured to process the target processing task based on the object value when the second verification succeeds.

In some implementations, the second processing module is further configured to determine a number of object values corresponding to the target object and a verification code for processing the object value based on the receiving name of the first intelligent device receiving the object value corresponding to the target object and the digital certificate obtained from the third-party authentication authority; and obtain the object value corresponding to the target object based on the number of object values and the verification code, generate an object value processing request based on the object value corresponding to the target object, and send the object value processing request to the second verification module; and the second verification module is further configured to generate an object value processing instruction based on the object value processing request, and send the object value processing instruction to the second processing module.

In some implementations, the second verification module is further configured to generate an encrypted object value processing instruction based on the object value processing request, and send the encrypted object value processing instruction to the second processing module.

In some implementations, the first processing module is further configured to receive the second verification result, determine the object value corresponding to the target object in the task execution instruction, and store the object value corresponding to the target object in the first intelligent device; and the first intelligent device is configured to complete the target processing task when successfully receiving the object value corresponding to the target object.

In some implementations, the first processing module is further configured to process the target processing task based on the second verification result generated based on the task execution instruction, and return a processing result to the second processing module by using the Bluetooth connection channel.

In some implementations, the first processing module and the second processing module each include a trusted execution environment module, and the first verification module and the second verification module each include a secure element.

In some implementations, the target object includes a commodity, and the target processing task includes a payment task.

According to an aspect of the implementations of the present specification, a task processing method is provided, applied to a first intelligent device and a second intelligent device, and including: generating, by the first intelligent device, a target processing task based on a target object, generating a first identification code corresponding to the target object based on the target processing task, and displaying the first identification code to the second intelligent device; obtaining, by the second intelligent device, the first identification code through scanning, generating a task execution instruction corresponding to the target processing task based on the first identification code when first verification on the first identification code succeeds, establishing a Bluetooth connection channel with the first intelligent device by using a Bluetooth device, and sending the task execution instruction to the first intelligent device based on the Bluetooth connection channel; and receiving, by the first intelligent device, the task execution instruction by using the Bluetooth connection channel, and processing the target processing task based on the task execution instruction when second verification on the task execution instruction succeeds.

In some implementations, the first identification code includes first attribute information of the first intelligent device and a Bluetooth address of the first intelligent device; and correspondingly, the generating the task execution instruction corresponding to the target processing task based on the first identification code when the verification on the first identification code succeeds includes: parsing, by the second intelligent device, the first identification code to determine the first attribute information of the first intelligent device and the Bluetooth address of the first intelligent device, performing first verification on the first attribute information and the Bluetooth address to generate a first verification result, and generating the task execution instruction corresponding to the target processing task based on the first verification result when the first verification succeeds.

In some implementations, the second intelligent device establishes a pairing relationship with the first intelligent device based on a Bluetooth address of the first intelligent device, to establish the Bluetooth connection channel.

In some implementations, the first attribute information includes a receiving name of the first intelligent device receiving an object value corresponding to the target object and a digital certificate obtained from a third-party authentication authority; and correspondingly, the generating, by the second intelligent device, the task execution instruction corresponding to the target processing task based on the first attribute information in the first identification code, and sending the task execution instruction to the first intelligent device based on the Bluetooth connection channel includes: determining, by the second intelligent device based on the first attribute information, the receiving name of the object value corresponding to the target object and the digital certificate obtained from the third-party authentication authority, generating the task execution instruction corresponding to the target processing task based on the receiving name of the object value corresponding to the target object and the digital certificate obtained from the third-party authentication authority, and sending the task execution instruction to the first intelligent device based on the Bluetooth connection channel.

In some implementations, the receiving, by the first intelligent device, the task execution instruction by using the Bluetooth connection channel, and processing the target processing task based on the task execution instruction when the second verification on the task execution instruction succeeds includes: receiving, by the first intelligent device, the task execution instruction by using the Bluetooth connection channel, parsing the task execution instruction to determine second attribute information of the second intelligent device and attribute information that is of the object value corresponding to the target object and that is obtained from the second intelligent device, performing second verification on the second attribute information and the attribute information that is of the object value corresponding to the target object and that is obtained from the second intelligent device, to generate a second verification result, and processing the target processing task based on the second verification result when the second verification succeeds, where the second attribute information includes a receiving name of the second intelligent device receiving the object value corresponding to the target object and a digital certificate obtained from the third-party authentication authority.

According to an aspect of the implementations of the present specification, a task processing apparatus is provided, disposed in a first intelligent device, the first intelligent device including a first processing module and a first verification module; the first verification module being configured to determine a target object, and generate a target processing task based on the target object; the first processing module being configured to generate a first identification code corresponding to the target object based on the target processing task, and establish a Bluetooth connection channel with a second intelligent device by using a Bluetooth device; and display the first identification code to the second intelligent device, and receive, by using the Bluetooth connection channel, a task execution instruction generated by the second intelligent device based on the first identification code; the first verification module being further configured to verify the task execution instruction generated based on the first identification code; and the first processing module being further configured to process the target processing task based on the task execution instruction when the verification succeeds.

According to an aspect of the implementations of the present specification, a task processing apparatus is provided, disposed in a second intelligent device, the second intelligent device including a second processing module and a second verification module; the second processing module being configured to obtain, through scanning, a first identification code displayed by a first intelligent device for a target processing task, the target processing task including a target object; the second verification module being configured to parse the first identification code, and verify the first identification code based on a parsing result of parsing the first identification code; the second processing module being further configured to establish a Bluetooth connection channel with the first intelligent device by using a Bluetooth device when the verification succeeds, and generate a task execution instruction based on the first identification code; and the second processing module being further configured to send the task execution instruction to the first intelligent device by using the Bluetooth connection channel, and receive the target processing task processed by the first intelligent device based on the task execution instruction.

According to an aspect of the implementations of the present specification, a computing device is provided, including: a memory and a processor, the memory being configured to store computer-executable instructions, the processor being configured to execute the computer-executable instructions, and the processor executing the computer-executable instructions to implement the steps of the task processing method.

According to an aspect of the implementations of the present specification, a computer-readable storage medium is provided, the computer-readable storage medium storing computer-executable instructions, and the instructions being executed by a processor to implement the steps of the task processing method.

According to an aspect of the implementations of the present specification, a computer program is provided, when the computer program is executed in a computer, the computer being enabled to perform the steps of the task processing method.

Implementations of the present specification implement a task processing system, method, and apparatus, where the task processing method includes: generating, by a first intelligent device, a target processing task based on a target object, generating a first identification code corresponding to the target object based on the target processing task, and displaying the first identification code to a second intelligent device; obtaining, by the second intelligent device, the first identification code through scanning, generating a task execution instruction corresponding to the target processing task based on the first identification code when first verification on the first identification code succeeds, establishing a Bluetooth connection channel with the first intelligent device by using a Bluetooth device, and sending the task execution instruction to the first intelligent device based on the Bluetooth connection channel; and receiving, by the first intelligent device, the task execution instruction by using the Bluetooth connection channel, and processing the target processing task based on the task execution instruction when second verification on the task execution instruction succeeds.

In an implementation of the present specification, an identification code is scanned by one party, first verification is performed on the obtained identification code, and second verification is performed on a task execution instruction generated based on a first verification result, so that a payment task for a target object is completed through two-way verification, thereby improving a payment level, and improving payment security.

DESCRIPTION OF IMPLEMENTATIONS

Figure 1:
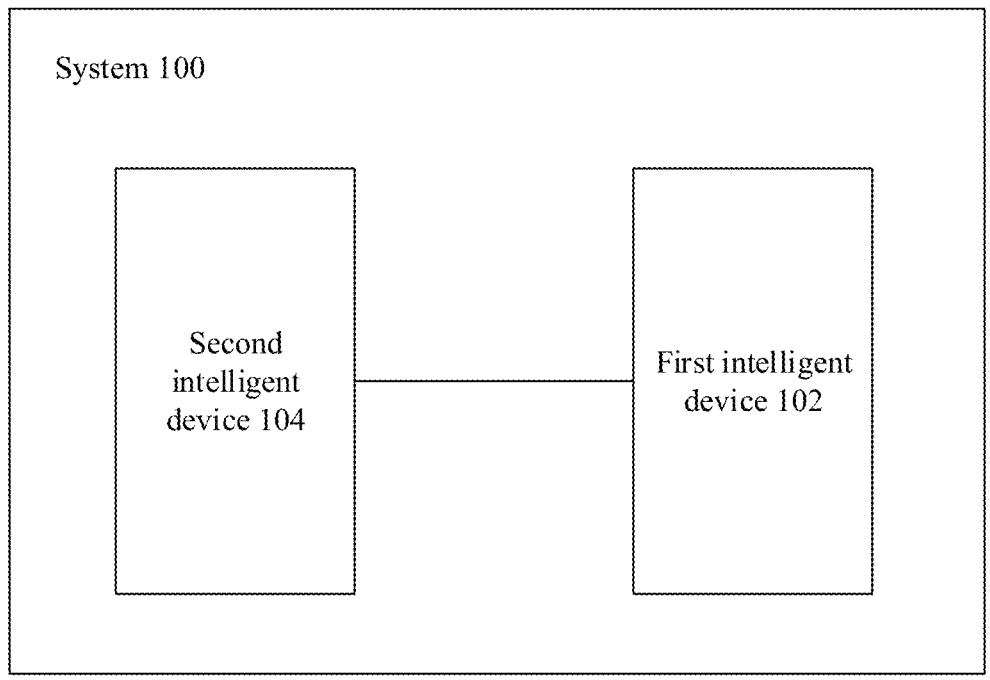
FIG. 1 is a schematic diagram illustrating a structure of a task processing system according to an implementation of the present specification.

In the descriptions herein, many specific details are set forth to facilitate a thorough understanding of the present specification. However, the present specification can be implemented in many other ways different from those described herein, and a person skilled in the art can make similar promotion without departing from the content of the present specification, so that the present specification is not limited to the example implementations disclosed below.

Terms used in one or more implementations of the present specification are merely used to describe example implementations, and are not intended to limit the one or more implementations of the present specification. The singular forms "a", "the", and "said" used in one or more implementations of the present specification and the appended claims are also intended to include plural forms unless otherwise specified in the context clearly. It should be further understood that the term "and/or" used in one or more implementations of the present specification refers to and includes any of or all possible combinations of one or more associated listed items.

It should be understood that, although the terms such as "first" and "second" may be used in one or more implementations of the present specification to describe various types of information, the information should not be limited to these terms. These terms are merely used to distinguish information of a same type from each other. For example, without departing from the scope of one or more implementations of the present specification, "first" can be referred to as "second", and similarly, "second" can be referred to as "first". Depending on the context, the term "if" used herein can be interpreted as "when . . . ", "while . . . ", or "in response to determining".

First, terms in one or more implementations of the present specification are explained.

TEE is short for trusted execution environment.

SE is short for secure element. The SE can include a built-in SE chip and an external SE chip of an intelligent terminal.

Value credential: A value tool in a digital form can be used for real commodity and service transactions.

Loaded value credential: A user initiates a value credential loading function by using a dedicated application (APP). After the user enters a loading amount by using a text-based user interface (TUI), the APP initiates a loading request to a server of a service organization. A transaction instruction is signed by using a terminal authentication private key. After receiving the loading instruction, the server of the service organization generates a loaded value credential, delivers the loaded value credential to a user terminal, and stores the loaded value credential in the user terminal, to complete loading.

The present specification provides a task processing system. The present specification also relates to a task processing method and apparatus, a computing device, a computer-readable storage medium, and a computer program. The task processing system, method, and apparatus, the computing device, the computer-readable storage medium, and the computer program are described in detail one by one in the following implementations.

The task processing method provided in one or more implementations of the present specification is applied to a dual-offline scenario in which users of both a payee and a payer directly transact with each other, and do not need to obtain online confirmation with a server (which can be understood as a fund storage party) of a service organization during the transaction. Therefore, a value credential may be loaded to a hardware terminal in advance, and an implementation can be referred to as loading a value credential. When a user initiates a transaction, a payer terminal initiates the transaction, generates a transaction instruction, and transmits the transaction and value credential information to the payee in a peer-to-peer manner. After verification by the payee succeeds, the immediate transaction is completed. After the payee and the payer complete the transaction, asynchronous online confirmation is possible, to convert the loaded value credential into an online value credential so as to perform an online transaction or load the value credential as a value credential used for offline payment.

When the task processing method provided in one or more implementations of the present specification is applied to an application scenario in which both a payee and a payer are offline (e.g. neither the payee nor the payer are connected to a network) during network payment. In this case, either the payee or the payer can perform, by using the task processing method, two-way verification on a two-dimensional code obtained through scanning and a task execution instruction generated based on the two-dimensional code, and perform information exchange through Bluetooth transmission, so as to complete transmission of a transaction instruction and a value credential. For example, when both the payee and the payer are offline, intelligent devices used by the payee and the payer can establish a connection relationship through Bluetooth.

For ease of understanding, the task processing method provided in one or more implementations of the present specification is described using an example application scenario of a shopping payment for illustrative purposes. However, the task processing method is not merely applicable to the shopping payment scenario, and can also be applied to other scenarios in which both parties interact with each other. For example, in a contract event scenario, both participants (e.g. a contracting party and an accepting party) can complete a certain task based on a contract platform. For another example, in some engineering project scenarios, both participants (e.g. a project contracting party and a project construction party) can complete a certain project based on a third-party platform (e.g., an engineering project party).

FIG. 1 is a schematic diagram illustrating a structure of a task processing system 100 according to an implementation of the present specification. The system 100 includes a first agent on a first intelligent device 102 and a second agent on a second intelligent device 104. In the description herein, operations of the first agent on the first intelligent device 102 are described as operations of the first intelligent device, and operations of the second agent on the second intelligent device 104 are described as operations of the second intelligent device, for brevity purposes. It should be noted that the first agent and the second agent each may not only use the local computation resources of the respective first intelligent device or second intelligent device, respectively, but also work with a remote server or cloud-based computation resources to perform operations, described herein with respect to the first intelligent device or the second intelligent device. For example, the following steps are included:

The first intelligent device 102 is configured to generate a target processing task based on a target object, generate a first identification code corresponding to the target object based on the target processing task, and display the first identification code to the second intelligent device 104.

The first intelligent device 102 and the second intelligent device 104 each include but are not limited to an intelligent user terminal, such as a mobile phone or a point of sales (POS) terminal. In addition, the first intelligent device 102 and the second intelligent device 104 can be a same intelligent device, or can be different intelligent devices, provided that interconnection can implemented through Bluetooth.

In some implementations, both the first intelligent device 102 and the second intelligent device 104 have a connection relationship with a third-party authentication authority. The third-party authentication authority can be considered as an authority that issues a value credential, e.g. the third-party authentication authority issues a value credential to the first intelligent device 102 and/or the second intelligent device 104, so that the first intelligent device 102 and/or the second intelligent device 104 implement/implements a commodity transaction by using the value credential issued by the third-party authentication authority. In this implementation of the present application, the first intelligent device 102 and the second intelligent device 104 are each considered as an intelligent terminal that carries only one account, e.g. the first intelligent device 102 is one collection account or one payment account, and the second intelligent device 104 is one payment account or one collection account, and the first intelligent device 102 and the second intelligent device 104 are each not considered as an intelligent terminal that can carry a plurality of accounts.

In some example implementations, when the task processing method is applied to a shopping payment scenario, the target object can be considered as any type of commodity to be purchased, and the target processing task can be a payment task generated by purchasing any type of commodity. When the task processing method is applied to a contract event scenario, the target object can be considered as a certain task to be completed, such as running, and the target processing task can be a running task generated by completing the running.

When the target object is a commodity, the first intelligent device 102 generates a payment task for the commodity based on the commodity, and then generates a first identification code corresponding to the commodity based on the payment task, where the first identification code can be considered as a code to be paid to and generated by a collection intelligent device (e.g. the first intelligent device 102), such as a two-dimensional code, a bar code, or a special character code, and finally displays the generated first identification code to a payment intelligent device (e.g. the second intelligent device 104).

Because the collection intelligent device is in a collection state, and a value of an accumulated received amount is large, a high security level may be implemented. In some implementations, the collection intelligent device can include a built-in first processing module and a built-in or external first verification module, to ensure security of the collection intelligent device. The first processing module includes but is not limited to a trusted execution environment module (such as a TEE module), and the first verification module includes but is not limited to a secure element (such as an SE module). If the SE module is an external SE module of an intelligent device (such as the first intelligent device 102 or the second intelligent device 104), the external SE module should have an intelligent device connection module such as a Bluetooth chip to implement connection to the intelligent device through Bluetooth.

For example, a trusted execution environment module of an intelligent terminal can quickly deploy a value credential by using a device digital certificate and a corresponding payment application that are preset at manufacturing or system deployment or received by the intelligent terminal through online pushing, which are authorized by a third-party authority, to, e.g. implement a dual-offline payment function.

In some example implementations, after the user downloads a dedicated APP from the intelligent terminal (e.g. the first intelligent device 102 or the second intelligent device 104), undergoes know-your-customer (KYC) identity authentication, and generates an account, the user starts to invoke the trusted execution environment module of the intelligent terminal to perform a hardware application activation operation. In the trusted execution environment module, a virtual secure network channel is established with a trusted service manager (TSM) by using a terminal management public/private key and a payment application that are preset at manufacturing or system deployment. After verification on device validity succeeds, the payment application is downloaded or updated by using the channel, a terminal authentication public/private key pair is generated, and a public key and device information are uploaded by using a secure channel, and are forwarded to a service organization by using the TSM. After verifying device validity and request validity, the service organization establishes a binding relationship between an account ID and the device, to issue a device/terminal digital certificate after the binding succeeds, for use in subsequent identity authentication and communication encryption by the user. When activating a hardware terminal, the service organization can set a security transaction policy to the device/terminal based on a KYC level of the user, such as a certificate validity period, an upper limit of a loading amount, a transaction limit, transaction times, and a service scenario, as a pre-check rule for all offline transactions. For a value credential loading process of the intelligent terminal, references can be made to the detailed descriptions of the above value credential loading process. Details are omitted herein for simplicity.

Figure 2:
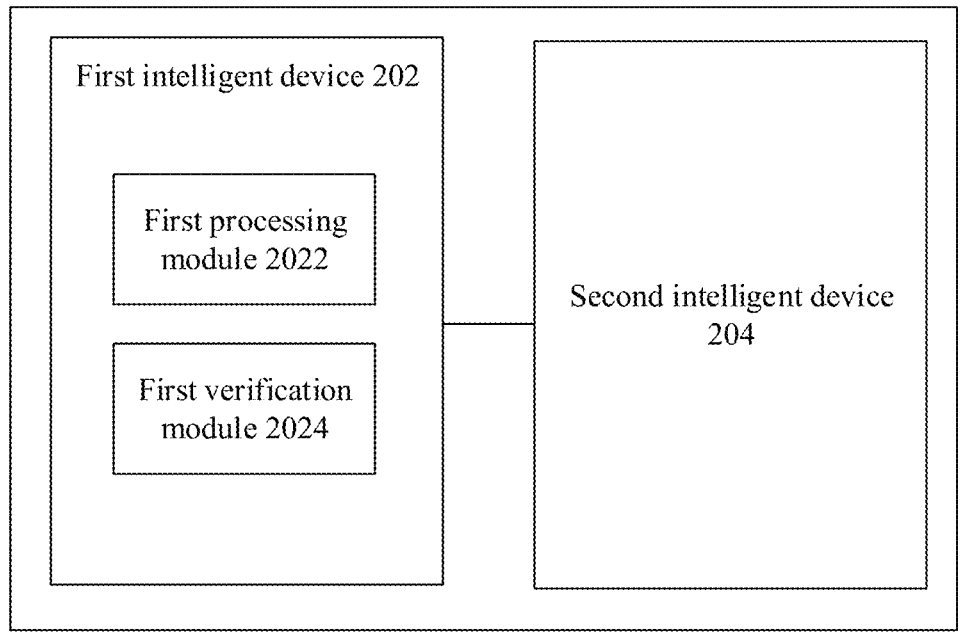
FIG. 2 is a schematic diagram illustrating a structure of a task processing system according to an implementation of the present specification.

In example implementations, the SE module falls into two types: a built-in SE chip and an external SE chip of the intelligent terminal. In addition, the SE module can provide higher-level security protection, but has limited computing and storage resources. The TEE module can provide a powerful computing capability in an independent and trusted secure environment. Therefore, the first intelligent device 102 as a payee can complete a payment task by using a TEE module and an SE module mode, to improve a risk level of the first intelligent device 102 without reducing the computing capability, and ensure security of the first intelligent device 102. A example implementation is shown in FIG. 2. The system structure includes:

The first intelligent setting 202 includes a first processing module 2022 and a first verification module 2024.

The first verification module 2024 is configured to generate the target processing task based on the target object, and send the target processing task to the first processing module.

The first processing module 2022 is configured to receive the target processing task, generate the first identification code corresponding to the target object based on the target processing task, and display the first identification code to the second intelligent device 204, where the first identification code includes first attribute information of the first intelligent device 202 and a Bluetooth address of the first intelligent device 202.

For example, when the first intelligent device 202 is a collection intelligent terminal, and the collection intelligent terminal includes a TEE module and an SE module, an actual application scenario is as follows: The first verification module 2024 (for example, the SE module) first determines a target object (e.g., a commodity), generates a payment task based on the commodity, and sends the payment task to the first processing module 2022 (for example, the TEE module). The TEE module has a good computing function. After receiving the payment task sent by the SE, the TEE module generates a first identification code corresponding to the commodity based on the received payment task, and displays the first identification code to the second intelligent device 204 (e.g., a payment intelligent terminal).

Figure 3:
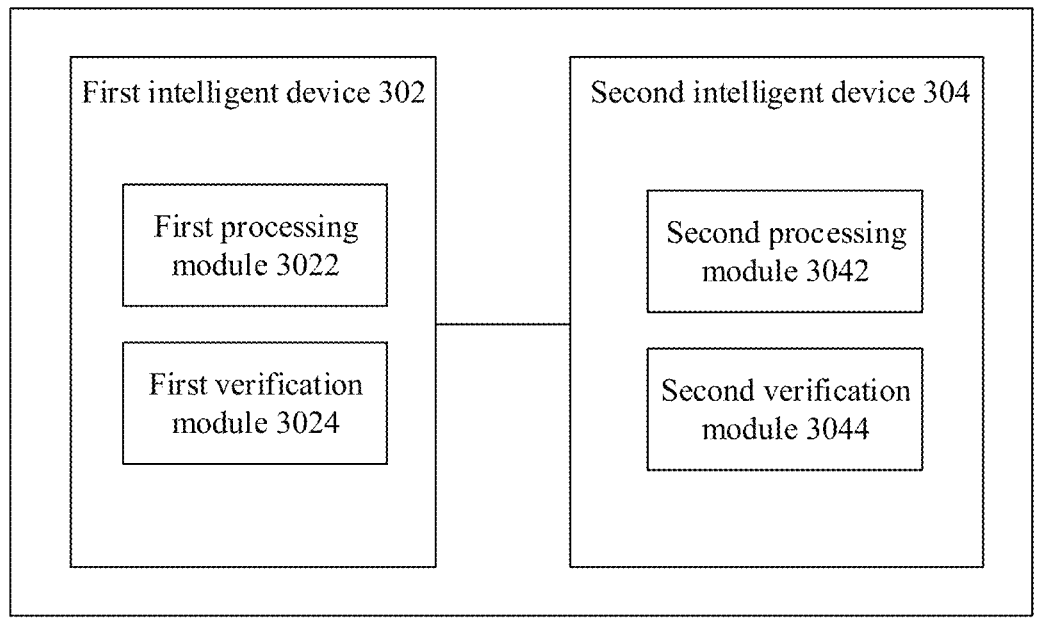
FIG. 3 is a schematic diagram illustrating a structure of a task processing system according to an implementation of the present specification.

In an implementation of the present specification, on the basis of not reducing a computing capability of the second intelligent device 204 and ensuring security of the second intelligent device 204, the second intelligent device 204 can also complete a payment task by using a TEE module and an SE module mode. In this case, the TEE module of the second intelligent device 204 obtains the first identification code through scanning. A example implementation is described in the following FIG. 3:

The first intelligent device 302 includes a first processing module 3022 and a first verification module 3024, and the second intelligent device 304 includes a second processing module 3042 and a second verification module 3044.

The first verification module 3024 is configured to generate the target processing task based on the target object, and send the target processing task to the first processing module.

The first processing module 3022 is configured to receive the target processing task, generate the first identification code corresponding to the target object based on the target processing task, and display the first identification code to the second intelligent device.

The second processing module 3042 is configured to obtain the first identification code through scanning, and send the first identification code to the second verification module.

The second verification module 3044 is configured to parse the first identification code, perform first verification based on a parsing result of parsing the first identification code, and send a verification result to the second processing module 3042 when the first verification succeeds.

For example, the second processing module 3042 can be considered as a trusted execution environment module (for example, a TEE module). That is, in some implementations, the second processing module 3042 of the second intelligent device 304 receives the first identification code, and the second verification module 3044 subsequently conducts security verification on the first identification code, which ensures a computing capability and security performance of the second intelligent device 304. In this case, the second verification module 3044 can be considered as a secure element (for example, an SE module).

The second intelligent device 104 is configured to obtain the first identification code through scanning, generate a task execution instruction corresponding to the target processing task based on the first identification code when first verification on the first identification code succeeds, establish a Bluetooth connection channel with the first intelligent device 102 by using a Bluetooth device, and send the task execution instruction to the first intelligent device 102 based on the Bluetooth connection channel.

In some example implementations, after the second processing module obtains the first identification code through scanning, the second processing module forwards the first identification code to the second verification module, and the second verification module implements security verification on the first identification code, to improve security performance of an entire payment task process. An example implementation is described as follows:

The second processing module 3042 is configured to obtain the first identification code through scanning, and send the first identification code to the second verification module 3044.

The second verification module 3044 is configured to parse the first identification code to determine first attribute information of the first intelligent device 302 and a Bluetooth address of the first intelligent device 302 based on a parsing result of parsing the first identification code, perform first verification on the first attribute information and the Bluetooth address to generate a first verification result, and send the first verification result to the second processing module 3042 when the first verification succeeds.

The second processing module 3042 is configured to determine processing information of the target object based on the first attribute information, generate a task execution instruction corresponding to the target processing task based on the processing information, establish a Bluetooth connection channel with the first intelligent device 302 by using a Bluetooth device, and send the task execution instruction to the first processing module 3022 based on the Bluetooth connection channel.

For example, the second verification module 3044 can be considered as the above SE module, and the SE module is not repeatedly described herein.

In some implementations, after obtaining the first identification code through scanning, the second processing module 3042 forwards the first identification code to the second verification module 3044. The second verification module 3044 parses the first identification code to obtain, through parsing, the first attribute information of the first intelligent device 302 and the Bluetooth address of the first intelligent device 302 that are included in the first identification code or value, for example, a receiving name (e.g. a payee or collection account name of the first intelligent device) of the first intelligent device 302 receiving an object value corresponding to the target object, a digital certificate (e.g., a terminal digital certificate issued by the service organization to the first intelligent device) obtained from a third-party authentication authority, the Bluetooth address (e.g., a Bluetooth MAC address of the first intelligent device) of the first intelligent device 302. Then, the second verification module 3044 verifies (e.g. verifies validity of the payee or collection account information, the terminal digital certificate, and the MAC address) the first attribute information and the Bluetooth information to generate a first verification result. When first verification on the first verification result succeeds, the second verification module 3044 sends the first verification result to the second processing module 3042. The second processing module 3042 determines the processing information (for example, an amount to be paid and a payment password that correspond to the target object) of the target object based on the first attribute information, and generates the task execution instruction corresponding to the target processing task based on the processing information. Then, the second processing module 3042 establishes the Bluetooth connection channel with the first processing module 3022 of the first intelligent device 302 by using the Bluetooth device, and sends the task execution instruction to the first processing module 3022 based on the Bluetooth connection channel.

For example, the second processing module 3042 is configured to establish a pairing relationship with the first processing module 3022 based on the Bluetooth address of the first intelligent device, to establish the Bluetooth connection channel, or the second verification module 3044 is configured to establish a pairing relationship with the first verification module 3024 based on the Bluetooth address of the first intelligent device, to establish the Bluetooth connection channel. Details are omitted herein for simplicity.

In this implementation of the present specification, a TEE module and an SE module can be used for both the first intelligent device 302 and the second intelligent device 304, e.g., a computing speed and computing efficiency of the first intelligent device 302 and the second intelligent device 304 can be ensured by using a high computing capability of the TEE module, and interaction and transaction security of the first intelligent device 302 and the second intelligent device 304 can also be ensured by using a high security level of the SE module. The TEE module and the SE module are used for both parties, to ensure security of an entire payment process and a completion speed of the payment task, thereby improving user experience. Similarly, a customized MCU chip can be used to replace the TEE or the SE module. However, a relationship between secure isolated storage and efficient computing and processing is to be balanced. For example, when there is no complex front-end user interaction, the TEE module may not be used, and the customized MCU is used to implement service main control processing. If there is another security mechanism, secure storage can also be implemented without the separate SE chip.

Correspondingly, the first attribute information includes the receiving name of the first intelligent device 302 receiving the object value corresponding to the target object and the digital certificate obtained from the third-party authentication authority.

For example, in a payment scenario, the first attribute information of the first intelligent device 302 includes but is not limited to the receiving name (e.g., the payee or collection account name of the first intelligent device) of the first intelligent device 302 receiving the object value corresponding to the target object, the digital certificate (e.g., the terminal digital certificate issued by the service organization to the first intelligent device) obtained from the third-party authentication authority, etc.

In example implementations, the second verification module 3044 parses the first identification code to obtain the payee or collection account name of the first intelligent device 302, the terminal digital certificate issued by the service organization to the first intelligent device 302, and the Bluetooth address of the first intelligent device 302, and sends the payee or collection account name of the first intelligent device 302, the terminal digital certificate issued by the service organization to the first intelligent device 302, and the Bluetooth address of the first intelligent device 302 to the second processing module of the second intelligent device 304 when determining that the payee or collection account of the first intelligent device 302 is secure, and the terminal digital certificate issued by the service organization to the first intelligent device 302, and the Bluetooth address of the first intelligent device 302 are valid.

In this implementation of the present specification, the second verification module 3044 of the second intelligent device 304 verifies the first identification code. Only when determining, through verification, that the collection account number, the terminal digital certificate, the Bluetooth address, etc. of the first intelligent device 302 are secure and valid, the second verification module 3044 deducts, based on the information that is in the first identification code and that is obtained through parsing, an amount corresponding to the target object from a payment account and provide a transaction password, to ensure security of a payment task and protect fund security of the second intelligent device 304.

For example, the second processing module 3042 is configured to determine a number of object values corresponding to the target object and a verification code for processing the object value based on the receiving name of the first intelligent device 302 receiving the object value corresponding to the target object and the digital certificate obtained from the third-party authentication authority; and obtain the object value corresponding to the target object based on the number of object values and the verification code, generate an object value processing request based on the object value corresponding to the target object, and send the object value processing request to the second verification module 3044.

The second verification module 3044 is configured to generate an object value processing instruction based on the object value processing request, and send the object value processing instruction to the second processing module.

For example, a payment scenario is still used as an example. After verification by the second verification module 3044 on the first identification code succeeds, the second verification module 3044 returns, to the second processing module 3042, the payee or collection account name of the first intelligent device 302 and the terminal digital certificate issued by the service organization to the first intelligent device that are in the first identification code and that are obtained through parsing. After confirming the payee information of the first intelligent device 302, the second processing module 3042 determines an amount of a value credential corresponding to the target object and verifies a transaction payment password, and deducts the value credential corresponding to the target object from the payment account of the second intelligent device 304 based on the amount of the value credential and the transaction payment password. For example, if the target object is 2 RMB, the deducted value credential is 2 RMB. After deducting the value credential corresponding to the target object, the second processing module 3044 generates an object value processing request based on the deduction operation, and then sends the object value processing request to the second verification module 3044. The object value processing request includes but is not limited to information such as the deducted value credential corresponding to the target object, the payment account of the second intelligent device 304, a serial number of a current transaction, the payee or collection account number, a validity period of the deducted value credential, and a payer terminal digital certificate of the second intelligent device 304. After receiving the object value processing request, the second verification module 3044 obtains the above information in the object value processing request, then generates an object value processing instruction based on the information, and returns the object value processing instruction to the second processing module 3042. After receiving the object value processing instruction, the second processing module 3042 generates a task execution instruction, and sends the task execution instruction to the first processing module 3022 of the first intelligent device 302 by using the Bluetooth connection channel. The object value processing instruction includes at least information such as the deducted value credential corresponding to the target object, the payment account of the second intelligent device 304, the serial number of the current transaction, the payee or collection account number, the validity period of the deducted value credential, and the payer terminal digital certificate of the second intelligent device 304.

In some implementations of the present specification, after determining that the payee or collection account of the first intelligent device 302 is secure and the terminal digital certificate is valid, the second intelligent device 304 deducts the value credential corresponding to the target object from the payment account of the second intelligent device 304, and then generates the task execution instruction in a transaction instruction manner based on the value credential and other important information of the current transaction, thereby further ensuring security of a transaction process.

In example implementations, the second verification module encrypts the object value processing request to generate an encrypted object value processing instruction, which further ensures security of the value credential in the transaction process. A example implementation is described as follows:

The second verification module 3044 is configured to generate an encrypted object value processing instruction based on the object value processing request, and send the encrypted object value processing instruction to the second processing module 3042.

The first intelligent device 102 is further configured to receive the task execution instruction by using the Bluetooth connection channel, and process the target processing task based on the task execution instruction when second verification on the task execution instruction succeeds.

For example, on the basis that the first intelligent device 302 includes the first processing module 3022 and the first verification module 3024, the task execution instruction is sent to the first processing module 3022 of the first intelligent device 302 by using the Bluetooth connection channel.

Correspondingly, the first processing module 3022 is configured to receive the task execution instruction by using the Bluetooth connection channel, and send the task execution instruction to the first verification module 3024.

The first verification module 3024 is configured to parse the task execution instruction to determine second attribute information of the second intelligent device and attribute information that is of the object value corresponding to the target object and that is obtained from the second intelligent device 304, perform second verification on the second attribute information and the attribute information that is of the object value corresponding to the target object and that is obtained from the second intelligent device 304, to generate a second verification result, and return the second verification result to the first processing module 3022 when the second verification succeeds.

The first processing module 3022 is configured to process the target processing task based on the object value when the second verification succeeds.

For example, after generating the task execution instruction, the second intelligent device 304 or the second processing module 3042 of the second intelligent device 304 sends the task execution instruction to the first processing module 3022 of the first intelligent device 302 by using the Bluetooth connection channel, to send the task execution instruction to the first verification module 3024 for security verification, so as to improve processing efficiency of the first intelligent device 302.

In example implementations, after receiving the task execution instruction, the first processing module 3024 first parses the task execution instruction to obtain the attribute information that is of the object value corresponding to the target object and that is sent by the second intelligent device 304. When the target object is a commodity, the object value can be understood as a value credential corresponding to the commodity, and the attribute information of the object value includes but is not limited to an amount of a value credential, a transaction serial number, a payer terminal authentication certificate, a validity period of the value credential. In addition, the transaction information that is of the object value corresponding to the target object and that is sent by the second intelligent device 304 is verified to generate the second verification result. When the second verification succeeds, the second verification result is returned to the first processing module 3022 of the first intelligent device 302.

In some implementations, the verification module of the first intelligent device 302 decrypts a transaction ciphertext (e.g., a second identification code value) by using its own terminal authentication private key, to obtain complete transaction information and a transaction instruction, where the transaction instruction includes a payer terminal authentication certificate, etc. After signature verification on the transaction instruction succeeds, the verification module verifies authenticity of the value credential, checks whether the transaction is within the validity period, and checks use of the loaded value credential, the transaction serial number, etc. to avoid double spending. In addition, the transaction instruction is registered, so that the transaction amount cannot be used again before confirmation, and then the verification result is returned to the processing module of the first intelligent device 302.

In addition, in a payment scenario, processing the target processing task based on the object value can be understood as completing the payment task based on the transaction amount.

In this implementation of the present specification, the first intelligent device 302 verifies the task execution instruction, and completes the target processing task based on the task execution instruction only when it is determined, through verification, that the payment account, the payment amount, etc. of the second intelligent device 304 are secure and accurate, thereby ensuring security of a processing process of the target processing task.

Correspondingly, the second attribute information includes a receiving name of the second intelligent device 304 receiving the object value corresponding to the target object and a digital certificate obtained from the third-party authentication authority.

For example, after the second processing module 3042 sends the task execution instruction to the first processing module 3022, the first processing module 3022 forwards the task execution instruction to the first verification module 3024. The first verification module 3024 first parses the task execution instruction to determine the second attribute information of the second intelligent device 304, for example, the payer name and the terminal digital certificate of the second intelligent device 304, and determine the attribute information that is of the object value corresponding to the target object and that is obtained from the second intelligent device 304, for example, the value credential corresponding to the target object, the serial number of the current transaction, the payee or collection account number, and the validity period of the deducted value credential that are obtained from the second intelligent device 304. Then, the first verification module 3024 verifies the task execution instruction based on the above information. A specific verification process is the same as a verification process of the above verification module 3024. Details are omitted herein for simplicity. After the verification succeeds, the target processing task is processed based on the task execution instruction.

In this implementation of the present specification, after receiving the task execution instruction sent by the second intelligent device 304, the first intelligent device 302 performs security verification on the task execution instruction, and processes the payment task based on the payment code only after verification on both the payer or payment account number and the value credential corresponding to the target object succeeds, to ensure transaction security.

In example implementations, the first processing module 3022 is configured to receive the second verification result, determine the object value corresponding to the target object in the task execution instruction, and store the object value corresponding to the target object in the first intelligent device 302.

The first intelligent device 302 is configured to complete the target processing task when successfully receiving the object value corresponding to the target object.

In some implementations, after second verification on the task execution instruction succeeds, the value credential that corresponds to the target object and that is deducted from the payment account of the second intelligent device 304 can be determined based on the information that is in the task execution instruction and that is obtained through parsing. In this case, the value credential is stored in the collection account of the first intelligent device 302. The current payment task of the target object is completed when the first intelligent device 302 successfully performs collection.

In example implementation, the first processing module 3022 is further configured to process the target processing task based on a second verification result generated based on the task execution instruction, and return a processing result to the second processing module 3042 by using the Bluetooth connection channel.

In this implementation of the present specification, after the value credential that is for the target object and that is paid by the payer is securely and accurately obtained, the value credential is stored in the collection account of the payee, to successfully complete the current payment task. In addition, the first verification module 3024 returns a completion result of the payment task to the first processing module 3022. The first processing module 3022 further returns the completion result to the second processing module based on the Bluetooth connection channel, to improve user experience of both parties.

In the above implementation, the first processing module 3022 and the second processing module 3042 each include a trusted execution environment module, and the first verification module 3024 and the second verification module 3044 each include a secure element. The target object includes a commodity, and the target processing task includes a payment task. No further limitation is imposed herein.

The task processing system provided in one or more implementations of the present specification includes a first intelligent device and a second intelligent device, where the first intelligent device is configured to generate a target processing task based on a target object, generate a first identification code corresponding to the target object based on the target processing task, and display the first identification code to the second intelligent device; the second intelligent device is configured to obtain the first identification code through scanning, generate a task execution instruction corresponding to the target processing task based on the first identification code when first verification on the first identification code succeeds, establish a Bluetooth connection channel with the first intelligent device by using a Bluetooth device, and send the task execution instruction to the first intelligent device based on the Bluetooth connection channel; and the first intelligent device is further configured to receive the task execution instruction by using the Bluetooth connection channel, and process the target processing task based on the task execution instruction when second verification on the task execution instruction succeeds.

In the task processing system, an identification code is scanned by one party, verification is separately performed on the identification code and a task execution instruction generated based on the identification code, and transmission is performed by using a Bluetooth connection channel. Therefore, double or two-way verification on a payment task is ensured, and efficiency and security are ensured through transmission by using the Bluetooth connection channel, thereby improving a payment level.

Figure 4:
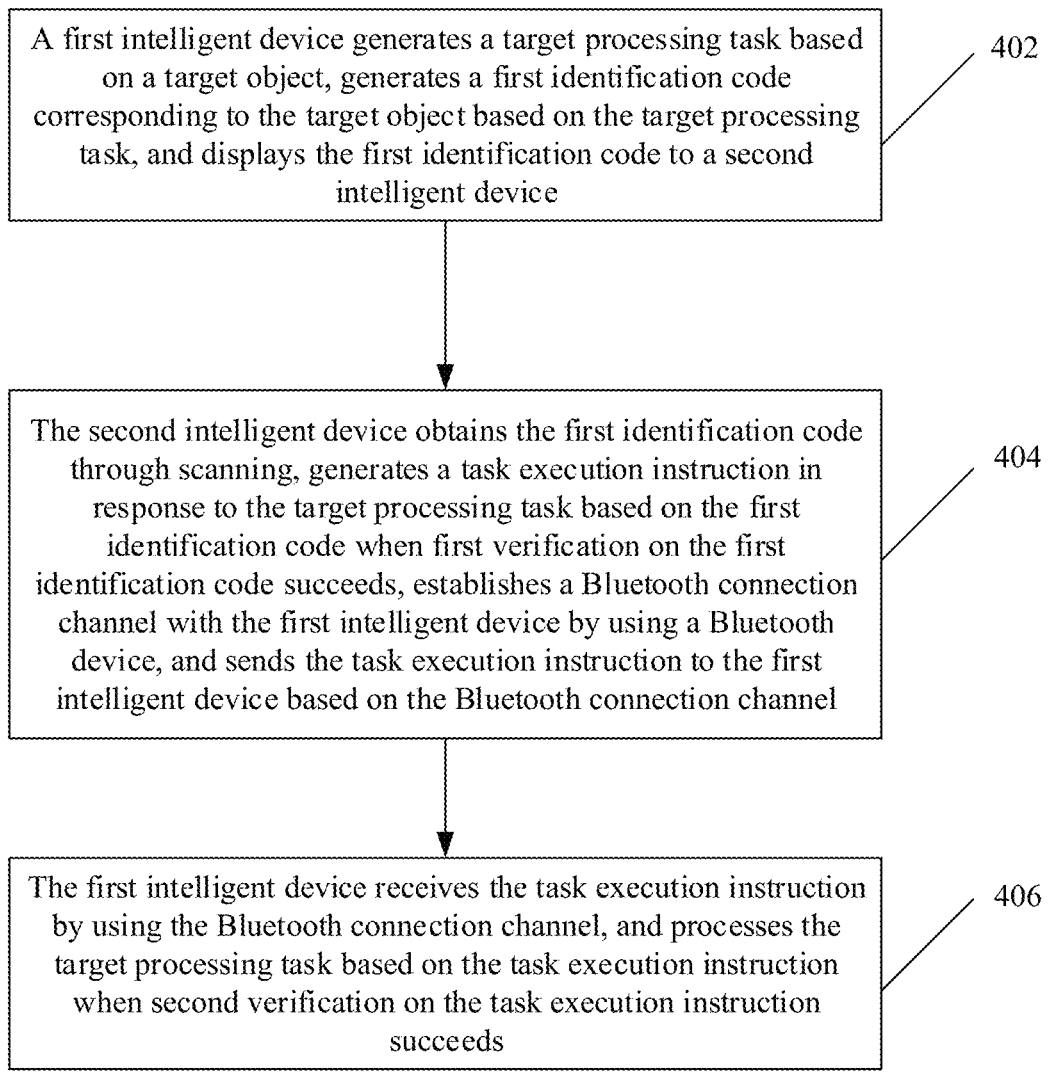
FIG. 4 is a flowchart illustrating a task processing method according to an implementation of the present specification.

Corresponding to the above system implementation, the present specification further provides an implementation of a task processing method. FIG. 4 is a flowchart illustrating a task processing method according to an implementation of the present specification. As shown in FIG. 4, for example, the method includes the following steps:

Step 402: A first intelligent device generates a target processing task based on a target object, generates a first identification code corresponding to the target object based on the target processing task, and displays the first identification code to a second intelligent device.

For example, when the first intelligent device is a collection intelligent terminal, and the second intelligent device is a payment intelligent terminal, an actual application scenario is as follows: The first intelligent device (e.g., the collection intelligent terminal) first determines a target object (e.g., a commodity), and generates a payment task based on the commodity, and the first intelligent device generates a first identification code corresponding to the commodity based on the payment task, and displays the first identification code to the second intelligent device (e.g., the payment intelligent terminal). The first identification code can be considered as a code to be paid to and generated by the collection intelligent device (e.g., the first intelligent device), for example, a two-dimensional code, a bar code, or a special character code. Finally, the first intelligent device displays the generated first identification code to the payment intelligent device (e.g., the second intelligent device). The first intelligent device can be a payee intelligent device, or can be a payer intelligent device. Details are omitted herein for simplicity.

Step 404: The second intelligent device obtains the first identification code through scanning, generates a task execution instruction corresponding to the target processing task based on the first identification code when first verification on the first identification code succeeds, establishes a Bluetooth connection channel with the first intelligent device by using a Bluetooth device, and sends the task execution instruction to the first intelligent device based on the Bluetooth connection channel.

For example, the first identification code includes first attribute information of the first intelligent device and a Bluetooth address of the first intelligent device.

Correspondingly, the generating the task execution instruction corresponding to the target processing task based on the first identification code when the verification on the first identification code succeeds includes: parsing, by the second intelligent device, the first identification code to determine the first attribute information of the first intelligent device and the Bluetooth address of the first intelligent device, performing first verification on the first attribute information and the Bluetooth address to generate a first verification result, and generating the task execution instruction corresponding to the target processing task based on the first verification result when the first verification succeeds.

The second intelligent device establishes a pairing relationship with the first intelligent device based on a Bluetooth address of the first intelligent device, to establish the Bluetooth connection channel.

The first attribute information includes a receiving name of the first intelligent device receiving an object value corresponding to the target object and a digital certificate obtained from a third-party authentication authority.

Correspondingly, the generating, by the second intelligent device, the task execution instruction corresponding to the target processing task based on the first attribute information in the first identification code, and sending the task execution instruction to the first intelligent device based on the Bluetooth connection channel includes: determining, by the second intelligent device based on the first attribute information, the receiving name of the object value corresponding to the target object and the digital certificate obtained from the third-party authentication authority, generating the task execution instruction corresponding to the target processing task based on the receiving name of the object value corresponding to the target object and the digital certificate obtained from the third-party authentication authority, and sending the task execution instruction to the first intelligent device based on the Bluetooth connection channel.

Step 406: The first intelligent device receives the task execution instruction by using the Bluetooth connection channel, and processes the target processing task based on the task execution instruction when second verification on the task execution instruction succeeds.

The first intelligent device receives the task execution instruction by using the Bluetooth connection channel, parses the task execution instruction to determine second attribute information of the second intelligent device and attribute information that is of the object value corresponding to the target object and that is obtained from the second intelligent device, performs second verification on the second attribute information and the attribute information that is of the object value corresponding to the target object and that is obtained from the second intelligent device, to generate a second verification result, and processes the target processing task based on the second verification result when the second verification succeeds.

The second attribute information includes a receiving name of the second intelligent device receiving the object value corresponding to the target object and a digital certificate obtained from the third-party authentication authority.

In the task processing method provided in one or more implementations of the present specification, the second intelligent device parses the first identification code sent by the first intelligent device, performs the first verification based on the parsing result of parsing the first identification code, and the first intelligent device performs the second verification on the task execution instruction that is generated based on the first identification code and that is sent by the second intelligent device. When double or two-way verification is performed on the target task, it is ensured that the executed task execution instruction is not tampered with, thereby improving task execution security.

A schematic solution of a task processing method in the implementations is described above. It should be noted that the technical solution of the task processing method and the technical solution of the above task processing system belong to the same concept. For details not described in detail in the technical solution of the task processing method, references can be made to the descriptions of the technical solution of the above task processing system.

Figure 5:
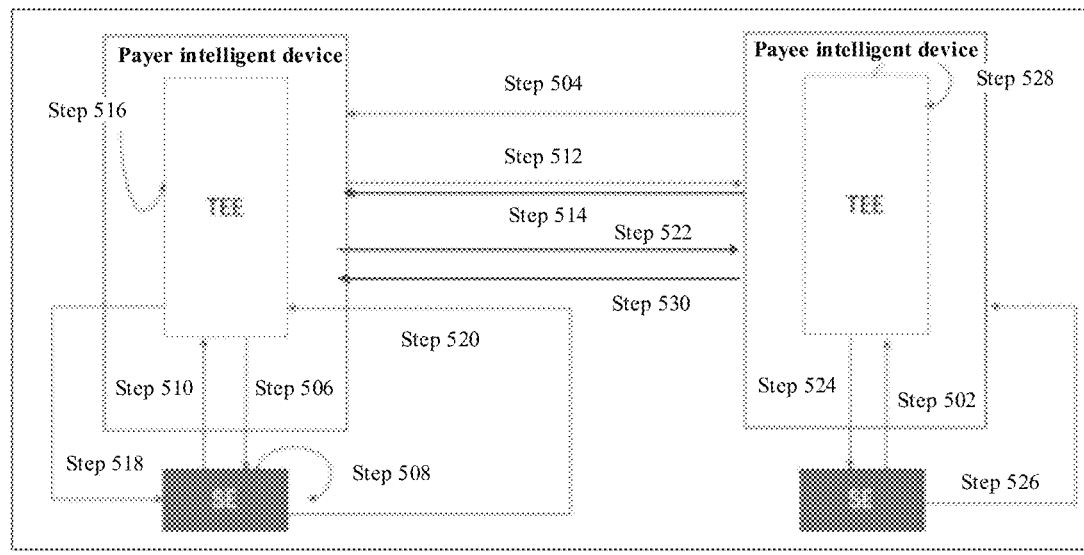
FIG. 5 is a flowchart illustrating a processing process of a task processing method according to an implementation of the present specification.

With reference to FIG. 5, the following further describes the task processing method by using an example that the task processing method provided in the present specification is applied to a payment scenario. FIG. 5 is a flowchart illustrating a processing process of a task processing method according to an implementation of the present specification. For example, the method includes the following steps:

In the payment scenario, the task processing method includes a payee intelligent device and a payer intelligent device, and the payee intelligent device and the payer intelligent device each select a TEE as a processing module and an external SE as a verification module.

Step 502: The SE module of the payee intelligent device generates a payment task based on a commodity, and sends the payment task to the TEE module.

In some implementations, the SE module of the payee intelligent device generates the payment task for the commodity based on information such as payee or collection account information and a terminal digital certificate, and then sends the payment task to the TEE module. The TEE module generates a collection two-dimensional code for the commodity based on the payment task, and displays the two-dimensional code to a payer by using a TUI (or an APP interface).

Step 504: The TEE module of the payee intelligent device generates a collection code based on the payment task, and displays the collection code to the payer intelligent device.

In some implementations, the payee intelligent device displays the generated collection two-dimensional code to the payer intelligent device by using an interface.

Step 506: The TEE module of the payer intelligent device obtains the collection code through scanning, parses the two-dimensional code to extract a two-dimensional code value in the collection code, and forwards the two-dimensional code value to the SE module.

For example, a collection module in the TEE module of the payer intelligent device obtains the collection code through scanning, parses the two-dimensional code to extract the two-dimensional code value in the collection code, and forwards the two-dimensional code value to the SE module.

Step 508: The SE module of the payer intelligent device verifies the two-dimensional code value obtained through parsing.

For example, that the SE module of the payer intelligent device verifies the two-dimensional code value obtained through parsing can be understood as follows: The SE module of the payer intelligent device verifies validity of the payee or collection account information, the terminal digital certificate, and the Bluetooth address of the payee intelligent device based on the obtained two-dimensional code value.

Step 510: The SE module of the payer intelligent device returns a verification result to the TEE module.

For example, that the SE module of the payer intelligent device returns a verification result to the TEE module can be understood as follows: The SE module of the payer intelligent device returns a terminal verification result of the payee intelligent device and transaction value credential information loaded by the payer intelligent device. In this case, if verification fails, the payer intelligent device rejects a current transaction; or if verification succeeds, the payer intelligent device continues to perform step 512.

Step 512: The TEE module of the payer intelligent device establishes a pairing relationship with the TEE module of the payee device to establish a Bluetooth connection channel.

For example, that the TEE module of the payer intelligent device establishes a pairing relationship with the TEE module of the payee intelligent device to establish a Bluetooth connection channel can be understood as: The TEE module of the payer intelligent device enables a Bluetooth device based on Bluetooth information in the terminal verification result of the payee intelligent device, and performs pairing connection with the TEE module of the payee device.

Step 514: The TEE module of the payee intelligent device returns a Bluetooth pairing result to the TEE module of the payer device.

That the TEE module of the payer intelligent device receives a returned Bluetooth pairing result can be understood as follows: The TEE module of the payer intelligent device receives a result that is returned by the TEE module of the payee intelligent device and that indicates whether Bluetooth pairing succeeds. Only after both parties agree on pairing connection, a payment instruction can be transmitted based on the Bluetooth connection channel.

In this implementation, that the TEE modules in the payer intelligent device and the payee intelligent device establish a Bluetooth connection channel is used as an example. In some implementations, establishment of the Bluetooth connection channel can be completed between the SE modules. Specific steps are the same as pairing between the TEE modules in this implementation. Details are omitted herein for simplicity.

Step 516: When the verification succeeds, the TEE module of the payer intelligent device enters transaction information.

For example, that the TEE module of the payer intelligent device enters transaction information can be understood as follows: When the verification succeeds, the TEE module of the payer intelligent device displays payee information by using an interface, receives a transaction amount and a payment password that are entered by a user by using the interface, and initiates transaction preparation.

Step 518: The TEE module of the payer intelligent device sends the transaction information to the SE module.

The transaction information includes an updated loaded value credential, a transaction serial number, a payee or collection account ID, a transaction amount, a validity period, a payer terminal digital certificate, historical transaction information of the loaded value credential, and another transaction element. After signature, together with the updated value credential, the transaction information is encrypted by using a terminal authentication public key of the payee.

Step 520: The SE module of the payer intelligent device generates an encrypted transaction instruction, and sends the encrypted transaction instruction to the TEE module.

For example, that the SE module of the payer intelligent device generates an encrypted transaction instruction can be understood as follows: The SE module of the payer intelligent device deducts a remaining amount of the loaded value credential, performs signature again by using a terminal authentication private key, and updates information such as the remaining balance of the loaded value credential after the instruction is generated.

Step 522: The TEE module of the payer intelligent device generates a payment instruction by using the encrypted transaction instruction, and sends the payment instruction to the TEE module of the payee intelligent device by using the Bluetooth connection channel.

In some implementations, after generating the payment instruction by using the encrypted transaction instruction, the TEE module of the payer intelligent device sends the payment instruction to the TEE module of the payee intelligent device by using the Bluetooth connection channel.

Step 524: The TEE module of the payee intelligent device receives the payment instruction, and forwards the payment instruction to the SE module of the payee intelligent device.

Step 526: After receiving the payment instruction, the SE module of the payee intelligent device parses the payment instruction, verifies a parsing result of the payment instruction to generate a verification result, and returns the verification result to the TEE module of the payee intelligent device.

For example, that the SE module of the payee intelligent device parses the payment instruction, and verifies a parsing result of the payment instruction to generate a verification result can be understood as follows: The SE module of the payee intelligent device decrypts a transaction ciphertext by using its own terminal authentication private key to obtain complete transaction information. After signature verification on the transaction instruction succeeds, the module verifies authenticity of the value credential, checks whether the transaction is within the validity period, and checks use of the loaded value credential, the transaction serial number, etc. to avoid double spending. In addition, the transaction instruction is registered, so that the transaction amount cannot be used again before confirmation.

Step 528: After receiving a collection confirmation instruction, the TEE module of the payee intelligent device ends the payment task.

Step 530: The TEE module of the payee intelligent device returns a transaction result to the TEE module of the payer intelligent device by using the Bluetooth connection channel.

For example, the SE module of the payee intelligent device returns the verification result to the TEE module, and the TEE module displays the verification result to the user by using an interface. After the user confirms the collection result, the payment task is ended, e.g., the payee intelligent device has received the value credential for the commodity, and can end the current transaction.

In some implementations, before the payee confirms the transaction online, the payer is not allowed to use the value credential corresponding to the transaction again. After the payee confirms the transaction online, if the transaction fails, the payee returns the value credential corresponding to the transaction to the payer; or if the transaction succeeds, the value credential corresponding to the transaction is allowed to use again after the value credential is converted into a value credential of an actual transaction amount of the payee.

According to the task processing method provided in this implementation of the specification, attribute information of an intelligent device that generates a first identification code is determined by verifying the first identification code, a task execution instruction is generated based on the determined attribute information, and then the task execution instruction is verified. In a two-way verification mode, it is ensured that transaction data is not tampered with, thereby improving a payment level, and ensuring payment security.

Figure 6:
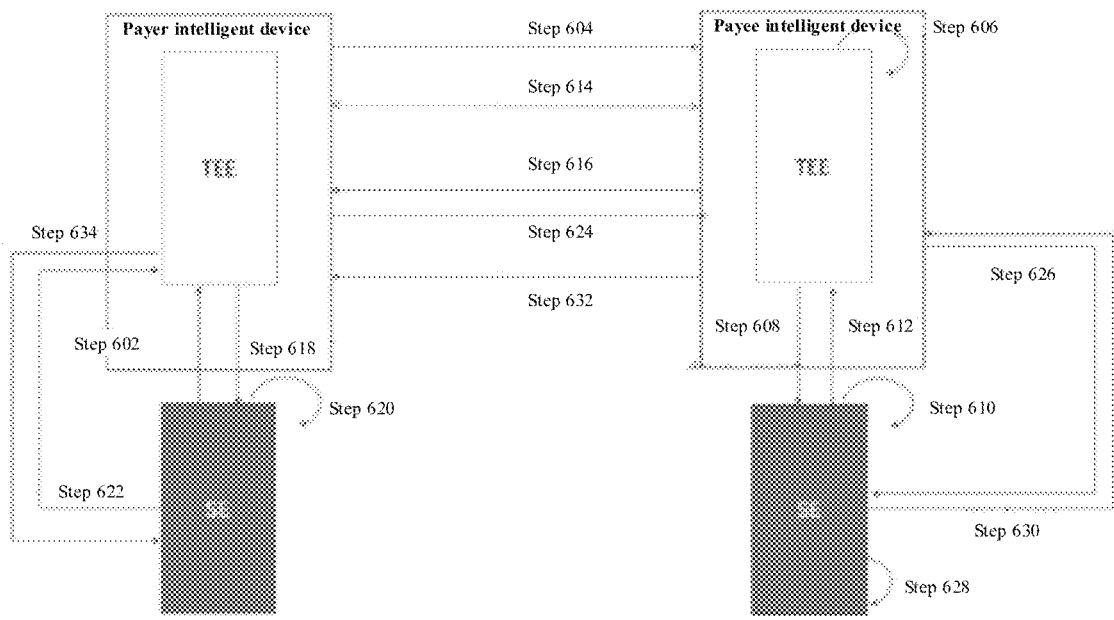
FIG. 6 is a flowchart illustrating a processing process of a task processing method according to an implementation of the present specification.

With reference to FIG. 6, the following further describes the task processing method by using an example that the task processing method provided in the present specification is applied to a payment scenario. FIG. 6 is a flowchart illustrating a processing process of a task processing method according to another implementation of the present specification. For example, the method includes the following steps:

In the payment scenario, the task processing method includes a payee intelligent device and a payer intelligent device, and the payee intelligent device and the payer intelligent device each select a TEE as a processing module and an external SE as a verification module.

Step 602: The SE module of the payer intelligent device generates a payment task based on a commodity, and sends the payment task to the TEE module.

In some implementations, the SE module of the payer intelligent device generates the payment task for the commodity based on information such as payee account information and a terminal digital certificate, and then sends the payment task to the TEE module. The TEE module generates a collection two-dimensional code for the commodity based on the payment task, and displays the two-dimensional code to a payer by using a TUI.

Step 604: The TEE module of the payer intelligent device generates a payment code based on the payment task, and displays the payment code to the payee intelligent device.

In some implementations, the payer intelligent device displays the generated payment two-dimensional code to the payee intelligent device by using an interface.

Step 606: The TEE module of the payee intelligent device obtains the payment code through scanning, and the TEE module of the payee intelligent device enters transaction information.

For example, a collection module in the TEE module of the payee intelligent device obtains the payment code through scanning, determines a transaction amount, and enters the transaction amount.

Step 608: The TEE module of the payee intelligent device parses the two-dimensional code to extract a two-dimensional code value in the payment code, and forwards the two-dimensional code value and the transaction amount to the SE module.

Step 610: The SE module of the payee intelligent device verifies the two-dimensional code value obtained through parsing, and generates a collection instruction.

For example, that the SE module of the payee intelligent device verifies the two-dimensional code value obtained through parsing can be understood as follows: The SE module of the payee intelligent device verifies validity of payer or payment account information, a terminal digital certificate, and a Bluetooth address of the payer intelligent device based on the obtained two-dimensional code value. The SE module verifies authentication legitimacy of the payment code terminal, and performs signature verification on the collection instruction, where the collection instruction includes transaction fields such as collection account information, a collection amount, and a serial number, and is signed by using a terminal authentication private key.

Step 612: The SE module of the payee intelligent device initiates a collection request to the TEE module.

Step 614: The TEE module of the payee intelligent device establishes a pairing relationship with the TEE module of the payer device to establish a Bluetooth connection channel.

For example, that the TEE module of the payee intelligent device establishes a pairing relationship with the TEE module of the payer intelligent device to establish a Bluetooth connection channel can be understood as: The TEE module of the payee intelligent device enables a Bluetooth device based on Bluetooth information in the two-dimensional code value of the payer intelligent device, and performs pairing connection with the TEE module of the payer intelligent device.

In this implementation, that the TEE modules in the payee intelligent device and the payer intelligent device establish a Bluetooth connection channel is used as an example. In some implementations, establishment of the Bluetooth connection channel can be completed between the SE modules. Details are omitted herein for simplicity.

Step 616: The TEE module of the payee device initiates a collection request to the TEE module of the payer intelligent device by using the Bluetooth connection channel.

Step 618: The TEE module of the payer intelligent device generates a collection instruction based on the collection request, and forwards the collection instruction to the SE module of the payer intelligent device.

Step 620: The TEE module of the payer intelligent device generates a payment instruction.

For example, that the SE module of the payer intelligent device generates a payment instruction can be understood as: The SE module of the payer intelligent device performs signature verification on the collection instruction and verifies account validity, and starts to assemble the payment instruction after the verification succeeds.

The transaction instruction includes an updated loaded value credential, a transaction serial number, a transaction amount, a payee or collection account ID, a validity period, a payer terminal digital certificate, historical transaction information of the loaded value credential, and another element. After signature, the transaction instruction is encrypted by using a terminal authentication public key of the payee, to generate the transaction instruction.

Step 622: The SE module of the payer intelligent device submits the payment instruction to the TEE module of the payer intelligent device.

Step 624: The TEE module of the payer intelligent device sends the payment instruction to the TEE module of the payee intelligent device by using the Bluetooth connection channel.

Step 626: The TEE module of the payee intelligent device receives the payment instruction, and forwards the payment instruction to the SE module of the payee intelligent device.

Step 628: After receiving the payment instruction, the SE module of the payee intelligent device parses the payment instruction, and verifies a parsing result of the payment instruction to generate a verification result.

For example, that the SE module of the payee intelligent device parses the payment instruction, and verifies a parsing result of the payment instruction to generate a verification result can be understood as follows: The SE module of the payee intelligent device decrypts a transaction ciphertext by using its own terminal authentication private key to obtain complete transaction information. After signature verification on the transaction instruction succeeds, the module verifies authenticity of the value credential, checks whether the transaction is within the validity period, and checks use of the loaded value credential, the transaction serial number, etc. to avoid double spending. In addition, the transaction instruction is registered, so that the transaction amount cannot be used again before confirmation.

Step 630: The SE module of the payee intelligent device returns a payment result to the TEE module of the payee intelligent device based on the verification result.

Step 632: After receiving the payment result, the TEE module of the payee intelligent device returns the payment result to the TEE module of the payer intelligent device, to end the payment task.

For example, the SE module of the payee intelligent device returns the verification result to the TEE module, and the TEE module displays the verification result to the user by using an interface. After the user confirms the collection result, the payment task is ended, e.g., the payee intelligent device has received the value credential for the commodity, and can end the current transaction.

In some implementations, before the payee confirms the transaction online, the payer is not allowed to use the value credential corresponding to the transaction again. After the payee confirms the transaction online, if the transaction fails, the payee returns the value credential corresponding to the transaction to the payer; or if the transaction succeeds, the value credential corresponding to the transaction is allowed to use again after the value credential is converted into a value credential of an actual transaction amount of the payee.

According to the task processing method provided in this implementation of the specification, attribute information of an intelligent device that generates a first identification code is determined by verifying the first identification code, a payment instruction is generated based on the determined attribute information, and then the payment instruction is verified. In a two-way verification mode, it is ensured that transaction data is not tampered with, thereby improving a payment level, and ensuring payment security.

Figure 7A:
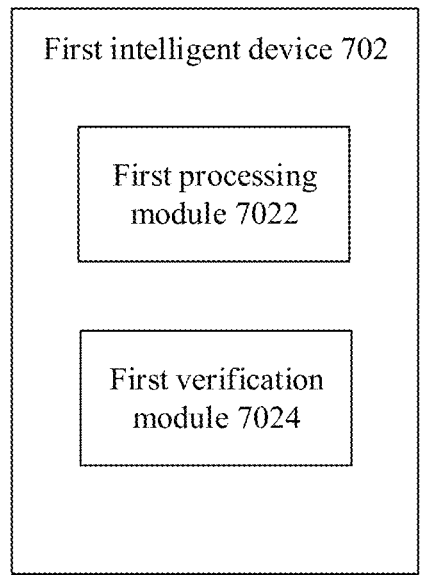
FIG. 7A is a schematic diagram illustrating a structure of a task processing apparatus according to an implementation of the present specification.

Corresponding to the above method implementation, the present specification further provides a first task processing apparatus implementation. FIG. 7A is a schematic diagram illustrating a structure of a task processing apparatus or agent according to an implementation of the present specification. As shown in FIG. 7A, the apparatus is disposed in a first intelligent device 702, and the first intelligent device having the first task processing apparatus or agent includes a first processing module 7022 and a first verification module 7024.

The first verification module 7024 is configured to determine a target object, and generate a target processing task based on the target object.

The first processing module 7022 is configured to generate a first identification code corresponding to the target object based on the target processing task, and establish a Bluetooth connection channel with a second intelligent device by using a Bluetooth device; and display the first identification code to the second intelligent device, and receive, by using the Bluetooth connection channel, a task execution instruction generated by the second intelligent device based on the first identification code;

The first verification module 7024 is further configured to verify the task execution instruction generated based on the first identification code.

The first processing module 7022 is further configured to process the target processing task based on the task execution instruction when the verification succeeds.

Figure 7B:
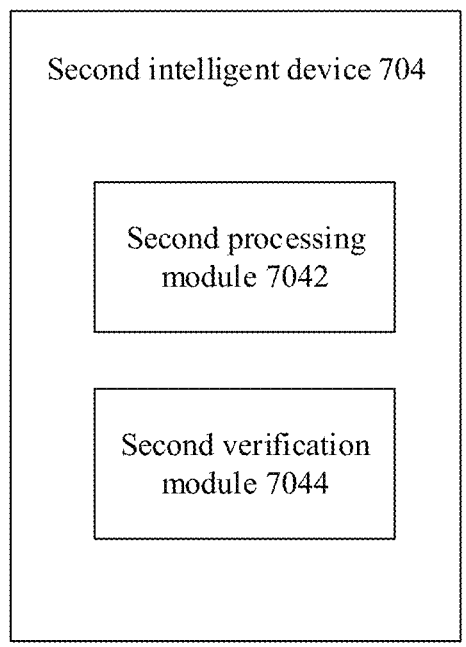
FIG. 7B is a schematic diagram illustrating a structure of a task processing apparatus according to an implementation of the present specification.

Corresponding to the above method implementation, the present specification further provides a second task processing apparatus or agent implementation. FIG. 7B is a schematic diagram illustrating a structure of a task processing apparatus (or agent) according to an implementation of the present specification. As shown in FIG. 7B, the apparatus is disposed in a second intelligent device 704, and the second intelligent device 704 having the second task processing apparatus or agent includes a second processing module 7042 and a second verification module 7044.

The second processing module 7042 is configured to obtain, through scanning, a first identification code displayed by a first intelligent device for a target processing task, where the target processing task includes a target object.

The second verification module 7044 is configured to parse the first identification code, and verify the first identification code based on a parsing result of parsing the first identification code.

The second processing module 7042 is further configured to establish a Bluetooth connection channel with the first intelligent device by using a Bluetooth device when the verification succeeds, and generate a task execution instruction based on the first identification code.

The second processing module 7042 is further configured to send the task execution instruction to the first intelligent device by using the Bluetooth connection channel, and receive the target processing task processed by the first intelligent device based on the task execution instruction.

According to the task processing apparatus provided in this implementation of the present specification, after an identification code of the first intelligent device 702 is received, the identification code is first verified. When the verification succeeds, a task execution instruction corresponding to a target processing task is generated, so that the first intelligent device 702 completes the target processing task based on the task execution instruction. Therefore, security of processing for the target processing task is greatly ensured through the two-way verification.

A schematic solution of a task processing apparatus in the implementations is described above. It should be noted that the technical solution of the task processing apparatus and the technical solution of the above task processing method applied to the first intelligent device and the second intelligent device belong to the same concept. For details not described in detail in the technical solution of the task processing apparatus, references can be made to the descriptions of the technical solution of the above task processing method.

Figure 8:
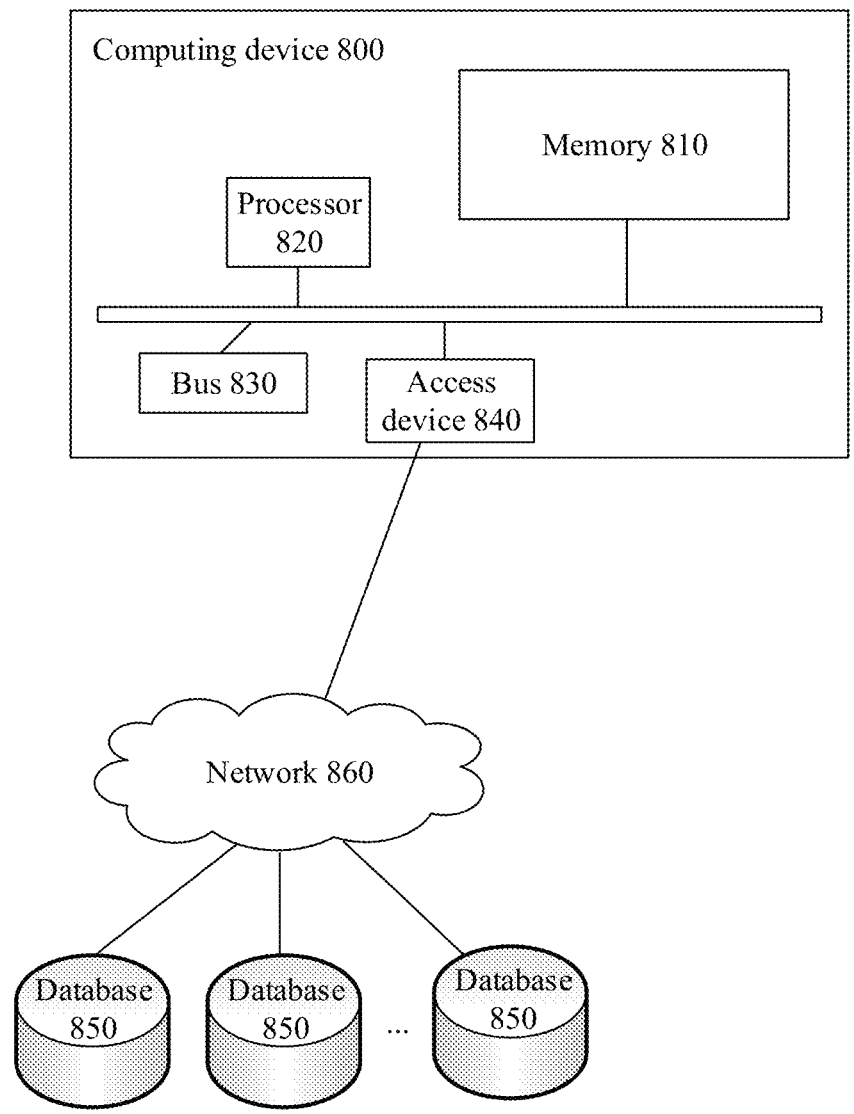
FIG. 8 is a block diagram illustrating a structure of a computing device according to an implementation of the present specification.

FIG. 8 is a block diagram illustrating a structure of a computing device 800 according to an implementation of the present specification. Components of the computing device 800 include but are not limited to a memory 830 and a processor 840. The processor 840 is connected to the memory 830 through a bus 830, and a database 850 is configured to store data.

The computing device 800 further includes an access device 840, and the access device 840 enables the computing device 800 to perform communication via one or more networks 860. Examples of such networks include a public switched telephone network (PSTN), a local area network (LAN), a wide area network (WAN), a personal area network (PAN), or a combination of communication networks such as the Internet. The access device 840 can include one or more of any type of wired or wireless network interface (for example, a network interface card (NIC)), for example, an IEEE804.33 wireless local area network (WLAN) wireless interface, a Worldwide Interoperability for Microwave Access (WiMAX) interface, an Ethernet interface, a Universal Serial Bus (USB) interface, a cellular network interface, a Bluetooth interface, or a near field communication (NFC) interface.

In an implementation of the present specification, the above components of the computing device 800 and other components not shown in FIG. 8 can also be connected to each other, for example, through a bus. It should be understood that the block diagram illustrating the structure of the computing device shown in FIG. 8 is merely used as an example, and is not intended to limit the scope of the present specification. Other components can be added or substituted by a person skilled in the art based on needs.

The computing device 800 can be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a stationary computing device such as a desktop computer or a PC. Alternatively or additionally, the computing device 800 can be a mobile or stationary server.

The processor 840 is configured to execute the following computer-executable instructions, and the processor executes the computer-executable instructions to implement the steps of the task processing method.

A schematic solution of a computing device in the implementations is described above. It should be noted that the technical solution of the computing device and the technical solution of the above task processing method belong to the same concept. For details not described in detail in the technical solution of the computing device, references can be made to the descriptions of the technical solution of the above task processing method.

An implementation of the present specification further provides a computer-readable storage medium. The computer-readable storage medium stores computer-executable instructions, and the instructions are executed by a processor to implement the steps of the task processing method.

A schematic solution of a computer-readable storage medium in the implementations is described above. It should be noted that the technical solution of the storage medium and the technical solution of the above task processing method belong to the same concept. For details not described in detail in the technical solution of the storage medium, references can be made to the descriptions of the technical solution of the above task processing method.

An implementation of the present specification further provides a computer program. When the computer program is executed in a computer, the computer is enabled to perform the steps of the above task processing method.

A schematic solution of a computer program in the implementations is described above. It should be noted that the technical solution of the computer program and the technical solution of the above task processing method belong to the same concept. For details not described in detail in the technical solution of the computer program, references can be made to the descriptions of the technical solution of the above task processing method.

Example implementations of the present specification are described herein. Other implementations fall within the scope of the appended claims are also included. In some situations, the actions or steps described in the claims can be performed in an order different from the order in the implementations, and the desired results can still be achieved. In addition, the process depicted in the accompanying drawings does not necessarily need a particular execution order to achieve the desired results. In some implementations, multi-tasking and concurrent processing are feasible or can be advantageous.

The computer instructions include computer program code, and the computer program code can be in a source code form, an object code form, an executable file, some intermediate forms, etc. The computer-readable medium can include any entity or apparatus that can including computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, etc. It should be noted that the content included in the computer-readable medium can be appropriately added or reduced based on the demands of legislation and patent practice within jurisdictions. For example, in some jurisdictions, the computer-readable medium does not include the electrical carrier signal or the telecommunications signal based on legislation and patent practice.

It should be noted that, for brief description, the above method implementations are expressed as a series of actions. However, a person skilled in the art should appreciate that the implementations of the present specification are not limited to the described action order, because some steps can be performed in other orders or performed simultaneously according to the implementations of the present specification. In addition, a person skilled in the art should also appreciate that all the implementations described in the present specification are preferred implementations, and the mentioned actions and modules are not necessarily mandatory to the implementations of the present specification.

In the above implementations, the descriptions of the implementations have respective focuses. For a part not described in detail in a certain implementation, references can be made to related descriptions in other implementations.

The preferred implementations of the present specification disclosed above are merely intended to help describe the present specification. The optional implementations do not describe all details in detail, and the present specification is not limited to the example implementations. Clearly, many modifications and changes can be made based on the content of the implementations of the present specification. These implementations are selected and described in detail in the present specification to better explain principles and practical applications of the implementations of the present specification, so that a person skilled in the art can better understand and use the present specification.

What is claimed is:

1. A task processing system, the system comprising a first agent on a first device and a second agent on a second device;
    the first agent being configured to generate a target processing task based on a target object, generate a first identification code corresponding to the target object based on the target processing task, and display the first identification code;
    the second agent being configured to obtain the first identification code through scanning, generate a task execution instruction corresponding to the target processing task based on the first identification code in response to first verification on the first identification code succeeds, establish a Bluetooth connection channel with the first device by using a Bluetooth device, and send the task execution instruction to the first device based on the Bluetooth connection channel; and
    the first agent being further configured to receive the task execution instruction by using the Bluetooth connection channel, and process the target processing task based on the task execution instruction in response to second verification on the task execution instruction succeeds,
    wherein the first agent includes a first processing module and a first verification module, and the second agent includes a second processing module and a second verification module;

the first verification module is configured to generate the target processing task based on the target object, and send the target processing task to the first processing module;

the first processing module is configured to receive the target processing task, generate the first identification code corresponding to the target object based on the target processing task, and display the first identification code;

the second processing module is configured to obtain the first identification code through scanning, and send the first identification code to the second verification module; and the second verification module is configured to parse the first identification code, perform first verification based on a parsing result of parsing the first identification code, and send a verification result of the first verification to the second processing module in response to the first verification succeeds.

2. The task processing system according to claim 1, wherein the first agent includes a first processing module and a first verification module;

the first verification module is configured to generate the target processing task based on the target object, and send the target processing task to the first processing module; and the first processing module is configured to receive the target processing task, generate the first identification code corresponding to the target object based on the target processing task, and display the first identification code, wherein the first identification code includes first attribute information of the first device and a Bluetooth address of the first device.

3. The task processing system according to claim 1, wherein the second processing module is further configured to establish a pairing relationship with the first processing module based on a Bluetooth address of the first device, to establish the Bluetooth connection channel.

4. The task processing system according to claim 1, wherein the second verification module is configured to establish a pairing relationship with the first verification module based on a Bluetooth address of the first device, to establish the Bluetooth connection channel.

5. The task processing system according to claim 1, wherein the second verification module is further configured to determine first attribute information of the first device and a Bluetooth address of the first device based on the parsing result of parsing the first identification code, perform first verification on the first attribute information and the Bluetooth address to generate a first verification result, and send the first verification result to the second processing module in response to the first verification succeeds;

wherein the first attribute information includes a receiving name of the first device receiving an object value corresponding to the target object and a digital certificate obtained from a third party; and wherein the second processing module is further configured to determine processing information of the target object based on the first attribute information, generate the task execution instruction corresponding to the target processing task based on the processing information, and send the task execution instruction to the first processing module based on the Bluetooth connection channel.

6. The task processing system according to claim 1, wherein the first processing module is further configured to receive the task execution instruction by using the Bluetooth connection channel, and send the task execution instruction to the first verification module;

the first verification module is further configured to parse the task execution instruction to determine second attribute information of the second device and attribute information thatis of an object value corresponding to the target object and that is obtained from the second device, perform second verification on the second attribute information and the attribute information that is of the object value corresponding to the target object and thatis obtained from the second device, to generate a second verification result, and return the second verification result to the first processing module in response to the second verification succeeds;

wherein the second attribute information includes a receiving name of the second device receiving the object value corresponding to the target object and a digital certificate obtained from a third party; and wherein the first processing module is further configured to process the target processing task based on the object value in response to the second verification succeeds.

7. The task processing system according to claim 6, wherein the second processing module is further configured to:

determine a number of object values corresponding to the target object and a verification code for processing the object value based on the receiving name of the first device receiving the object value corresponding to the target object and the digital certificate obtained from the third party; and obtain the object value corresponding to the target object based on the number of object values and the verification code, generate an object value processing request based on the object value corresponding to the target object, and send the object value processing request to the second verification module; and wherein the second verification module is further configured to generate an object value processing instruction based on the object value processing request, and send the object value processing instruction to the second processing module.

8. The task processing system according to claim 7, wherein the second verification module is further configured to generate an encrypted object value processing instruction based on the object value processing request, and send the encrypted object value processing instruction to the second processing module.

9. The task processing system according to claim 8, wherein the first processing module is further configured to receive the second verification result, determine the object value corresponding to the target object in the task execution instruction, and store the object value corresponding to the target object in the first device; and the first agent is configured to complete the target processing task in response to successfully receiving the object value corresponding to the target object.

10. The task processing system according to claim 9, wherein the first processing module is further configured to process the target processing task based on the second verification result generated based on the task execution instruction, and return a processing result to the second processing module by using the Bluetooth connection channel.

11. The task processing system according to claim 1, wherein the first processing module and the second processing module each include a trusted execution environment module, and the first verification module and the second verification module each include a secure element.

12. The task processing system according to claim 1, wherein the target object includes a commodity, and the target processing task includes a payment task.

13. A method, comprising:
generating, by a first device, a target processing task based on a target object, generating a first identification code corresponding to the target object based on the target processing task, and displaying the first identification code;
obtaining, by a second device, the first identification code through scanning, generating a task execution instruction corresponding to the target processing task based on the first identification code in response to first verification on the first identification code succeeds, establishing a Bluetooth connection channel with the first device by using a Bluetooth device, and sending the task execution instruction to the first device based on the Bluetooth connection channel; and
receiving, by the first device, the task execution instruction by using the Bluetooth connection channel, and processing the target processing task based on the task execution instruction in response to second verification on the task execution instruction succeeds,
wherein the first identification code includes first attribute information of the first device and a Bluetooth address of the first device; and
the generating the task execution instruction includes:
parsing, by the second device, the first identification code to determine the first attribute information of the first device and the Bluetooth address of the first device,
performing first verification on the first attribute information and the Bluetooth address to generate a first verification result, and
generating the task execution instruction corresponding to the target processing task based on the first verification result in response to the first verification succeeds.

14. The method according to claim 13, wherein the establishing the Bluetooth connection channel with the first device includes establishing, by the second device, a pairing relationship with the first device based on a Bluetooth address of the first device, to establish the Bluetooth connection channel.

15. The method according to claim 14, wherein the first attribute information includes a receiving name of the first device receiving an object value corresponding to the target object and a digital certificate obtained from a third party; and
the generating, by the second device, the task execution instruction corresponding to the target processing task based on the first attribute information in the first identification code, and sending the task execution instruction to the first device based on the Bluetooth connection channel includes:
determining, by the second device based on the first attribute information, the receiving name of the object value corresponding to the target object and the digital certificate obtained from the third party, generating the task execution instruction corresponding to the target processing task based on the receiving name of the object value corresponding to the target object and the digital certificate obtained from the third party, and sending the task execution instruction to the first device based on the Bluetooth connection channel.

16. The method according to claim 15, wherein the receiving, by the first device, the task execution instruction by using the Bluetooth connection channel, and processing the target processing task based on the task execution instruction in response to the second verification on the task execution instruction succeeds includes:
receiving, by the first device, the task execution instruction by using the Bluetooth connection channel,
parsing the task execution instruction to determine second attribute information of the second device and attribute information that is of the object value corresponding to the target object and that is obtained from the second device,
performing second verification on the second attribute information and the attribute information that is of the object value corresponding to the target object and that is obtained from the second device, to generate a second verification result, and
processing the target processing task based on the second verification result in response to the second verification succeeds, and
wherein the second attribute information includes a receiving name of the second device receiving the object value corresponding to the target object and a digital certificate obtained from the third party.

17. A non-transitory computer-readable storage medium, the computer-readable storage medium storing computer-executable instructions, and the instructions, when executed by one or more processors, enabling the one or more processors to, individually or collectively, implement acts including:
generating, by a first device, a target processing task based on a target object, generating a first identification code corresponding to the target object based on the target processing task, and displaying the first identification code;
obtaining, by a second device, the first identification code through scanning, generating a task execution instruction corresponding to the target processing task based on the first identification code in response to first verification on the first identification code succeeds, establishing a Bluetooth connection channel with the first device by using a Bluetooth device, and sending the task execution instruction to the first device based on the Bluetooth connection channel; and
receiving, by the first device, the task execution instruction by using the Bluetooth connection channel, and processing the target processing task based on the task execution instruction in response to second verification on the task execution instruction succeeds,
wherein the processing the target processing task includes:
parsing the task execution instruction to determine second attribute information of the second device and attribute information that is of an object value corresponding to the target object and that is obtained from the second device,
performing the second verification on the second attribute information and the attribute information to generate a second verification result indicating whether the second verification succeeds, the second attribute information including a receiving name of the second device receiving the object value corresponding to the target object and a digital certificate obtained from the third party; and processing the target processing task based on the object value in response to the second verification succeeds.

18. The non-transitory computer-readable storage medium according to claim 17, wherein the first identification code includes first attribute information of the first device and a Bluetooth address of the first intelligent device; and the generating the task execution instruction corresponding to the target processing task based on the first identification code in response to the verification on the first identification code succeeds includes:

parsing, by the second device, the first identification code to determine the first attribute information of the first device and the Bluetooth address of the first device, performing first verification on the first attribute information and the Bluetooth address to generate a first verification result, and generating the task execution instruction correspondingto the target processing task based on the first verification result in response to the first verification succeeds.

19. A method, comprising:

generating, by a first device, a target processing task based on a target object, generating a first identification code corresponding to the target object based on the target processing task, and displaying the first identification code;

obtaining, by a second device, the first identification code through scanning, generating a task execution instruction corresponding to the target processing task based on the first identification code in response to first verification on the first identification code succeeds, establishing a Bluetooth connection channel with the first device by using a Bluetooth device, and sending the task execution instruction to the first device based on the Bluetooth connection channel; and receiving, by the first device, the task execution instruction by using the Bluetooth connection channel, and processing the target processing task based on the task execution instruction in response to second verification on the task execution instruction succeeds, wherein the processing the target processing task includes:

parsing the task execution instruction to determine second attribute information of the second device and attribute information that is of an object value corresponding to the target object and that is obtained from the second device, performing the second verification on the second attribute information and the attribute information to generate a second verification result indicating whether the second verification succeeds, the second attribute information including a receiving name of the second device receiving the object value corresponding to the target object and a digital certificate obtained from the third party; and processing the target processing task based on the object value in response to the second verification succeeds.

20. The method according to claim 19, wherein the establishing the Bluetooth connection channel with the first device includes establishing, by the second device, a pairing relationship with the first device based on a Bluetooth address of the first device, to establish the Bluetooth connection channel.

* * * * *